(12) United States Patent
Kau et al.

(10) Patent No.: US 9,247,386 B2
(45) Date of Patent: Jan. 26, 2016

(54) LOCATION-BASED MOBILE APPLICATION AND SERVICE SELECTION

(71) Applicant: International Business Machines Corporation, Armonk, NY (US)

(72) Inventors: Christian Kau, Los Altos, CA (US); Jeffrey S. Pierce, Sunnyvale, CA (US); Christine M. Robson, San Jose, CA (US); Jerald T. Schoudt, Douglassville, PA (US)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 14/132,890

(22) Filed: Dec. 18, 2013

(65) Prior Publication Data

US 2015/0172862 A1 Jun. 18, 2015

(51) Int. Cl.
*H04W 24/00* (2009.01)
*H04W 4/02* (2009.01)
*H04L 29/08* (2006.01)

(52) U.S. Cl.
CPC ............... *H04W 4/021* (2013.01); *H04L 67/18* (2013.01)

(58) Field of Classification Search
CPC ... H04W 64/00; H04W 8/18; H04L 29/08657
See application file for complete search history.

(56) References Cited

U.S. PATENT DOCUMENTS

| | | | |
|---|---|---|---|
| 6,202,023 B1 | 3/2001 | Hancock et al. | |
| 6,677,894 B2 | 1/2004 | Sheynblat et al. | |
| 7,707,140 B2 | 4/2010 | Leishman et al. | |
| 7,729,953 B2 | 6/2010 | Pandurangan | |
| 7,890,376 B2 | 2/2011 | Barrese et al. | |
| 7,958,081 B2 | 6/2011 | Fitzpatrick et al. | |
| 8,069,169 B2 | 11/2011 | Fitzpatrick et al. | |
| 8,098,894 B2 | 1/2012 | Soderstrom | |
| 8,156,206 B2 | 4/2012 | Kiley et al. | |
| 8,612,756 B1 * | 12/2013 | Meier et al. ................... | 713/166 |
| 2004/0067773 A1 | 4/2004 | Rachabathuni et al. | |
| 2004/0198396 A1 | 10/2004 | Fransioli | |

(Continued)

OTHER PUBLICATIONS

Boopathy, B., et al "A Localized Location based architecture for path tracking and mapping services," 3rd Motorola China Technology Symposium, Jul. 11, 2006, pp. 1-5, IPCOM000141409D, Copyright 2006 Motorola, Inc.

(Continued)

*Primary Examiner* — Vladimir Magloire
*Assistant Examiner* — Shantell L Heiber
(74) *Attorney, Agent, or Firm* — Fleit Gibbons Gutman Bongini & Bianco PL; Jose Gutman

(57) ABSTRACT

A method, mobile device, application server, and computer program product, for requesting a geospatial-location-specific application associated with a geospatial-location-specific service that are both specific to a geospatial location corresponding to a current geospatial location of the mobile device. The mobile device determines a current geospatial location of the mobile device and sends a request message to an application server. The request message includes the current geospatial location of the mobile device and a request to receive a geospatial-location-specific application associated with a geospatial-location-specific service. The mobile device receives a response message including identification of a candidate geospatial-location-specific application associated with a geospatial-location-specific service, specific to a geospatial location within a defined nearby vicinity area of the current geospatial location of the mobile device. The mobile device displays a list of selectable choices prioritized by proximity of geospatial location associated with each candidate geospatial-location-specific application.

20 Claims, 12 Drawing Sheets

(56) References Cited

U.S. PATENT DOCUMENTS

| | | | | |
|---|---|---|---|---|
| 2004/0203854 | A1* | 10/2004 | Nowak | 455/456.1 |
| 2010/0036807 | A1* | 2/2010 | Lieske et al. | 707/3 |
| 2010/0131584 | A1 | 5/2010 | Johnson | |
| 2010/0131586 | A1 | 5/2010 | Karaoguz et al. | |
| 2010/0190513 | A1 | 7/2010 | Andreasson | |
| 2010/0299450 | A1* | 11/2010 | Mendell | 709/238 |
| 2010/0302056 | A1 | 12/2010 | Dutton et al. | |
| 2011/0057025 | A1* | 3/2011 | Denzer et al. | 235/375 |
| 2014/0051458 | A1* | 2/2014 | Khosla | 455/456.1 |

OTHER PUBLICATIONS

Disclosed Anonymously, "Location-based mobile calendar," electronic Publication on Feb. 24, 2012, pp. 1-4 IPCOM000215391D.

IBM, "Method for Providing Accelerated and Consistent Integration Between Location-Based Map Service Provider(s) and Graphical User Interfaces," Sep. 27, 2007, pp. 1-4, IPCOM000158671D.

Kjeldskov, J., et al., "GeoHealth: a location-based service for home healthcare workers," Journal of Location Based Serives, May 11, 2008, pp. 1-2, vol. 4 Issue 1, DOI:10.1080/17489721003742819.

Kindberg, T,. et al., "People, Places, Things: Web Presence for the Real World". 3rd Annual Wireless and Mobile Computer Systems and Applications, Feb. 2000, pp. 1-18, Copyright Hewlett-Packard Company 2000.

Rost, M., et al., "Geolocation in the mobile web browser," ubicomp 2010, Sep. 26-29, 2010, pp. 1-2, ACM 978-1-60558-843-8/10/09.

* cited by examiner

GEOSPATIAL APP + SERVICE DB 414

| Geospatial Location(s) 502 | APP ID 504 | SVC ID 506 | APP Description 508 | SVC Description 510 | APP Loc Pointer 512 | SVC LOC 514 | Source of APP 516 | Source of SVC 518 | Popularity 520 | Rating 522 |
|---|---|---|---|---|---|---|---|---|---|---|
| 530 | | | | | | | | | | |
| 532 | | | | | | | | | | |
| 534 | | | | | | | | | | |

GEOSPATIAL APP DB 326

| APP ID 702 | SVC ID 704 | Geospatial Location(s) 706 | APP Description 708 | SVC Description 710 | Favorite Rank 712 | URL 714 | APP Source 716 | SVC Source 718 | APP Access Frequency 720 | APP Access History 722 |
|---|---|---|---|---|---|---|---|---|---|---|
| | | | | | | | | | | |
| | | | | | | | | | | |

| 802 | 804 | 806 | 808 | 810 | 812 | 814 | 816 | 818 | 820 |
|---|---|---|---|---|---|---|---|---|---|
| Header | Geospatial Location(s) | Device ID | Time Stamp | APP ID | APP Description | SVC ID | SVC Description | APP Source | SVC Source |

| 902 | 904 | 906 | 908 | 910 | 912 | 914 | 916 | 918 |
|---|---|---|---|---|---|---|---|---|
| Header | APP ID | APP Description | SVC ID | SVC Description | URL | APP Source | SVC Source | APP Code |

LOCATION-BASED MOBILE APPLICATION AND SERVICE SELECTION

BACKGROUND

Various embodiments of the present invention relate to wireless communication devices, mobile devices, and wireless communication systems, that facilitate selection of mobile applications and related services, and more specifically, to location-based selection of mobile web applications and services.

The primary method of accessing mobile web applications and mobile web sites—entering a URL—suffers from two primary drawbacks. First, users may not know the appropriate URL for the application or service they want to access. Second, manually typing URLs on mobile devices is slow and cumbersome.

Previous and current approaches primarily rely on alternative approaches to discovering and entering URLs. For example, mobile devices can use infrared beacons and RFID tags as a way to discover URLs for local services. As other examples, mobile devices can use readers of QR codes to discover URLs for local services or can use Near-Field Communication to detect URLs using device sensors. However, these approaches normally require that users have a line of sight or direct physical proximity to the source of the QR codes or other markers, and thus are not always easily accessible, or even easily discoverable, by users.

SUMMARY

In one embodiment a method comprises determining, with a mobile device comprising a processor coupled to memory, a current geospatial location of the mobile device; storing a representation of the current geospatial location in the memory; sending a query message to an application server, the query message including the representation of the current geospatial location and a request for receiving, with the mobile device, at least one geospatial-location-specific application associated with at least one geospatial-location-specific service, both the geospatial-location-specific application and the geospatial-location-specific service being specific to the geospatial location of the mobile device; receiving, from the server, a response message destined for reception by the mobile device and including at least one of identification of at least one candidate geospatial-location-specific application associated with at least one geospatial-location-specific service, both the candidate geospatial-location-specific application and the geospatial-location-specific service being specific to at least one of the current geospatial location of the mobile device and to a geospatial location within a defined nearby vicinity area of the current geospatial location of the mobile device, and a uniform resource locator (URL), lower than a top level domain uniform resource locator (TLD URL), associated with a network location of an instance of the at least one candidate geospatial-location-specific application; and presenting to a user of the mobile device at least one user-selectable choice corresponding to at least one of the identification of the at least one candidate geospatial-location-specific application and the URL, the at least one user-selectable choice being selectable by the user to request receiving, with the mobile device, a copy of the corresponding at least one candidate geospatial-location-specific application.

In another embodiment, a method comprises receiving, with an application server, a request message from a mobile device, the request message including indication of a current geospatial location of the mobile device determined by the mobile device, and a request for at least one geospatial-location-specific application and associated geospatial-location-specific service that are both specific to the current geospatial location of the mobile device; searching, with the application server and based on the current geospatial location of the mobile device and the request received in the request message, in a geospatial application and service database to find search results that include at least one candidate geospatial-location-specific application and associated geospatial-location-specific service that matches the request in the request message; and sending, with the application server, a response message destined for reception by the mobile device, the response message including at least one of an identification of a candidate geospatial-location-specific application associated with a geospatial-location-specific service that are both specific to the current geospatial location of the mobile device; and an identification of a candidate geospatial-location-specific application associated with a geospatial-location-specific service that are both specific to a geospatial location that is within a defined nearby vicinity area of the current geospatial location of the mobile device.

In another embodiment, a method comprises determining, with a mobile device comprising a processor coupled to memory, a current geospatial location of the mobile device; sending a request message to an application server, the request message including a representation of the current geospatial location of the mobile device and a request for receiving, with the mobile device, at least one geospatial-location-specific application associated with at least one geospatial-location-specific service, both the geospatial-location-specific application and the geospatial-location-specific service being specific to the current geospatial location of the mobile device; receiving, from the application server, a response message including at least one of identification of a candidate geospatial-location-specific application associated with a geospatial-location-specific service, both the candidate geospatial-location-specific application and the geospatial-location-specific service being specific to the current geospatial location of the mobile device; and identification of at least one candidate geospatial-location-specific application associated with a geospatial-location-specific service, both the candidate geospatial-location-specific application and the geospatial-location-specific service being specific to a geospatial location that is within a defined nearby vicinity area of the current geospatial location of the mobile device; and presenting, with the mobile device, a list of user selectable choices prioritized by proximity of geospatial location associated with each candidate geospatial-location-specific application associated with a geospatial-location-specific service relative to the current geospatial location of the mobile device.

In another embodiment, a computer program product for a mobile device, comprises: a non-transitory storage medium readable by a processing circuit of a mobile device and storing instructions which, responsive to being executed by the processing circuit, cause the processing circuit to perform operations comprising: determining a current geospatial location of the mobile device; storing the representation of the current geospatial location in memory; sending a request message to the application server, the request message including a representation of the current geospatial location of the mobile device and a request for receiving at least one geospatial-location-specific application associated with at least one geospatial-location-specific service, both the geospatial-location-specific application and the geospatial-location-specific service being specific to the current geospatial location of the mobile device. The operations including: receiving, from the application server, a response message including at least one of identification of at least one candidate geospatial-location-specific application associated with a geospatial-location-specific service, both the candidate geospatial-location-specific application and the geospatial-location-specific service being specific to the current geospatial location of the mobile device; and identification of at least one candidate geospatial-location-specific application associated with a geospatial-location-specific service, both the candidate geospatial-location-specific application and the geospatial-location-specific service being specific to a geospatial location that is within a defined nearby vicinity area of the current geospatial location of the mobile device. The operations also include: presenting at a user interface associated with the mobile device a list of user selectable choices prioritized by proximity of geospatial location associated with each candidate geospatial-location-specific application associated with a geospatial-location-specific service relative to the current geospatial location of the mobile device.

BRIEF DESCRIPTION OF THE SEVERAL VIEWS OF THE DRAWINGS

The accompanying figures in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 5 is a more detailed view of the example geospatial application and services database shown in FIG. 4.

FIG. 7 is a more detailed view of the example geospatial application database shown in FIG. 3.

FIG. 8 is a diagram showing an example of a request message.

FIG. 9 is a diagram showing an example of a response message.

DETAILED DESCRIPTION

Figure 1:
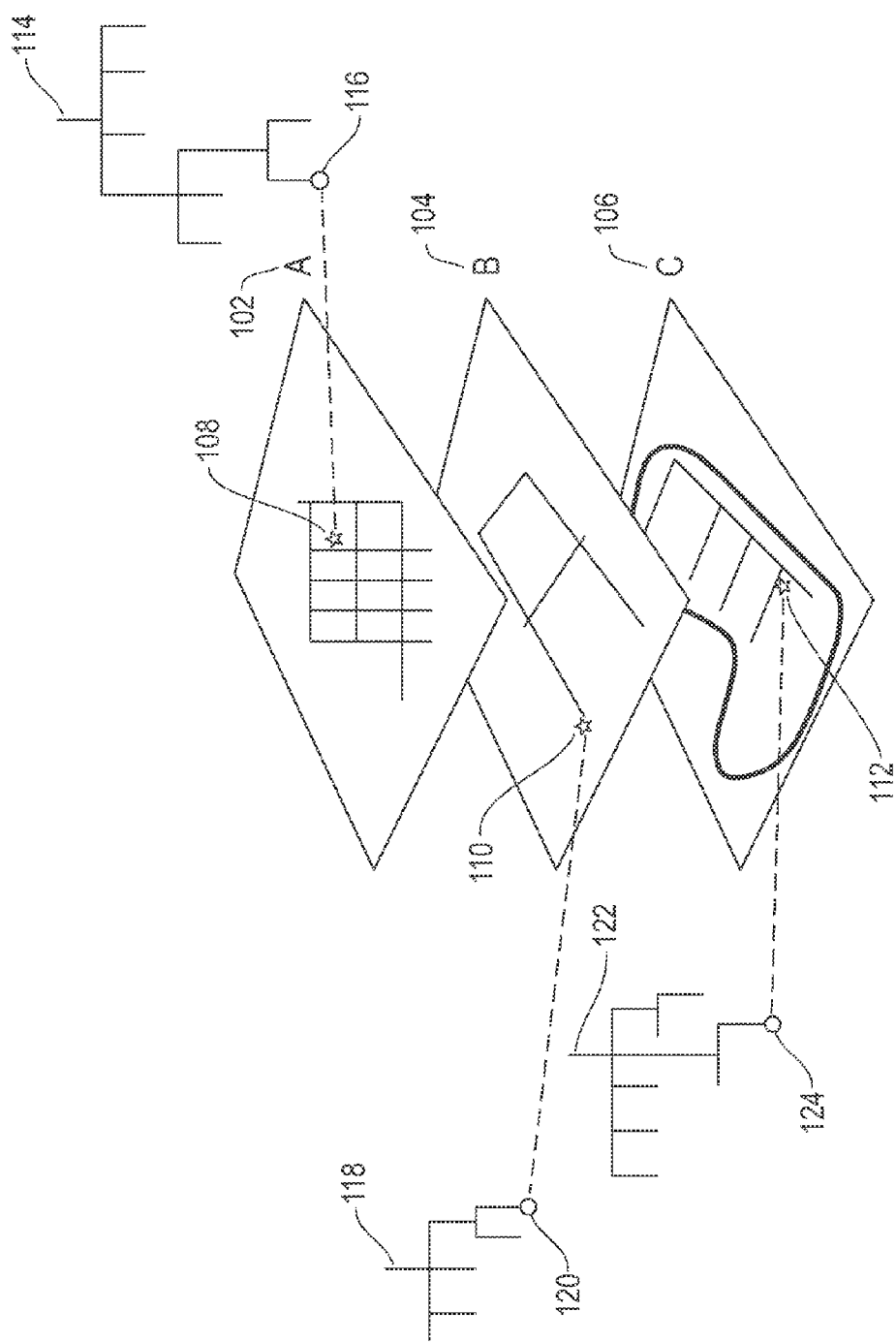
FIG. 1 is a diagram illustrating an example of three geospatial maps in which geospatial locations are mapped directly to location-specific applications and related location-specific services. The applications can be found using low-level URLs (that are other than top level URLs).

As required, detailed embodiments are disclosed herein; however, it is to be understood that the disclosed embodiments are merely examples and that the devices, systems and methods described below can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any appropriately detailed structure and function. Further, the terms and phrases used herein are not intended to be limiting, but rather, to provide an understandable description. Additionally, unless otherwise specifically expressed or clearly understood from the context of use, a term as used herein describes the singular or the plural of that term.

The terms "a" or "an", as used herein, are defined as one or more than one. The term "plurality", as used herein, is defined as two or more than two. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, commanded, altered, modified, built, composed, constructed, designed, or that has any combination of these characteristics to carry out a given function. The term "adapted to" describes hardware, software or a combination of hardware and software that is capable of, able to accommodate, to make, or that is suitable to carry out a given function. The terms "controller", "computer", "server", "client", "computer system", "computing system", "personal computing system", or "processing system" describe examples of a suitably configured processing system adapted to implement one or more embodiments of the present disclosure. Any suitably configured processing system is similarly able to be used by embodiments of the present disclosure, for example and not for limitation, a personal computer, a laptop computer, a tablet computer, a personal digital assistant, a workstation, or the like. A processing system may include one or more processing systems or processors. A processing system can be realized in a centralized fashion in one processing system or in a distributed fashion where different elements are spread across several interconnected processing systems. The term "personal computing system" describes a processing system that includes a user interface and which is suitably configured and adapted to implement one or more embodiments of the present disclosure. The terms "network", "computer network", "computing network", and "communication network", describe examples of a collection of computers and devices interconnected by communications channels that facilitate communications among users and allows users to share resources. The terms "wireless network", "wireless communication network", and "wireless communication system", similarly describe a network and system that communicatively couples computers and devices primarily or entirely by wireless communication media. The terms "wired network" and "wired communication network" similarly describe a network that communicatively couples computers and devices primarily or entirely by wired communication media.

The term "communication device" is intended to broadly cover many different types of electronic devices that can receive signals, and in most cases can transmit signals, to communicate with other devices, and may also operate in a communication system. The term "wireless communication device" is intended to broadly cover many different types of communication devices that can wirelessly receive signals, and in most cases can wirelessly transmit signals, and may also operate in a wireless communication system. For example, and not for any limitation, a wireless communication device can include any one or a combination of the following: a two-way radio, a cellular telephone, a mobile phone, a Smartphone, a two-way pager, a wireless messaging device, a personal computer, a laptop personal computer, a tablet computer, a personal digital assistant, and other similar devices.

The terms "portable communication device" or "mobile device" are intended to broadly cover many different types of communication devices that are portable or that can be transported between locations by a user. For example, and not for any limitation, a mobile device can include any one or a combination of the following: a wireless communication device, a laptop personal computer, a notebook computer, a desktop computer, a personal computer, a Personal Digital Assistant, a tablet computer, gaming units, and other handheld electronic devices that can be carried on one's person.

The terms "remote" or "remotely located" are intended to broadly cover many different types of physical arrangements between two or more devices or systems, where the devices or systems are not in direct physical contact with each other.

The term "application and related service" is intended to broadly define many different types of software programs that can perform an action for a user and related content that helps the user take an action or obtain information.

In general, it is proposed to allow users to detect and access web applications and related services by specific location. More specifically, a location-based variant to traditional DNS lookup is provided according various embodiments of the present invention. Rather than mapping a well-formatted domain name (e.g., www.storename.com) to an IP address, it is proposed to directly map a location to potential applications and services available for that particular location. This location-based selection approach is more powerful and intuitive for users to discover location-relevant mobile applications and services, since it allows mapping a location to a service specific to that location. For example, a user interface of a mobile electronic device can provide to a user an inventory checking application and related location-specific service for a particular <Store Name> store that the user is standing in rather than to a more general application and service (e.g., a general <Store Name> website—www.storename.com), which streamlines the user's access to that location-specific service.

According to one example, a server and a mobile client device wirelessly communicate to facilitate the location-based selection approach for a user of the mobile device. The server maintains the mappings between geospatial regions (e.g., polygons, paths, points) and mobile web application or service descriptions (e.g., application name, application description, entity or company offering the application or service, ratings, etc.). These mappings might be curated (e.g., as the role of registrars for curating the mappings between domain names and IP addresses) or they might be crowd-sourced, or a combination of the two approaches. The server, according the present example, is also responsible for identifying an initial list of candidate applications or services when presented with a requesting client and returning the list to that client.

The client, according to the present example, detects the user's location (for example, using at least one sensor available on the mobile devices). Alternatively, the at least one sensor is external to the mobile device, the sensor information from the at least one sensor being transmitted to the device contemporaneous with the mobile device being located at a known geospatial location. While geospatial location is frequently determined through a mix of GPS, cell tower triangulation, and Wi-Fi network detection, any sensor or combination of sensors that provide location could be used and issues a query to the server for applications or services relevant to that particular location. The client is responsible for formatting and presenting the candidate results to the user interface. For example, a client mobile device presents at a user interface associated with the client mobile device a list of user selectable choices prioritized by proximity of geospatial location associated with each identified candidate geospatial-location-specific application (that is associated with a geospatial-location-specific service) relative to the current geospatial location of the mobile device. Together the client and server work to provide fast access to mobile applications and services specific to the user's location. So that, for example, the user can directly access an inventory check service for a <Store Name> store they're in, rather than getting a link to the general <Store Name> corporate website.

An example of an initial screen showing mobile apps specifically for the user's current location, and optionally showing nearby location-specific mobile apps, may include one or more of the following.

1) A list of candidate apps organized by the source of the mobile app and proximity to the user's current location; 2) A view of the details of a candidate application; and 3) A view of the details for the source of a service related to a candidate application.

The client mobile device can filter, format, and present candidate application results in several ways to allow users to best find the application or service the user wants to use. Several examples of presentation methods include:

Leveraging previous service usage to prioritize recently or frequently accessed applications and related services.

Allowing users to sort or filter services by the offering entity or company, by proximity, by the area of the containing region, by popularity, by rating, by the recent use of the service creation or its last update, by the type or category of application or service, etc.

Prioritizing mobile applications or services based on the operating hours of the offering entity or service. For example, prioritizing by which businesses are currently open.

Prioritizing results based on a combination of factors, such as the popularity of services at different times. For example, a restaurant might be more popular at 7 PM on Fridays, while a bank might be more popular at noon on the same day.

Prioritizing results based on temporal events. For example, prioritizing by services available at a ball park while a baseball game is currently occurring.

In addition, the mobile client device can cache previously retrieved mobile apps and services for specific locations and use them to provide initial service suggestions while waiting for the server to return the most up-to-date list. Such a cache could allow users to access desired applications or services even more quickly. The client device might also preemptively cache commonly used or likely application and services as the user's location changes to pre-populate the list of candidate applications or services.

Previous systems in the past have mapped locations only to information content. For example, online search services like Yelp and Goggle places use location to identify relevant information content for users, such as information content about buildings, art, restaurants, etc., and present the information content to users. That information content may include URLs that can be followed by a user to find websites associated with that information content.

On the other hand, various embodiments according to the present invention differ from previous system approaches in at least two ways. First, rather than using location to identify information content entities, e.g., identifying restaurants, stores, etc., an approach according to an embodiment of the present invention can use location to identify relevant applications and related services. Second, past approaches that included URLs in information content provided to users merely pointed to top-level domain names (e.g., www.storename.com), while various embodiments of the present invention can directly point to applications or services targeted to the user's particular location. This location-based selection approach is more powerful and intuitive for users to discover location-relevant mobile applications and services, since it allows mapping a location directly to a mobile application and related service specific to that location.

It should be noted that while various embodiments of the invention may be described using mobile web applications and related services, other embodiments could alternatively be used to identify appropriate native (or hybrid) mobile applications for a location. For this alternative approach, for example, search results could provide direct links to applications in various application stores (like Apple's App Store or Google's Play Store), or the descriptions for mobile web app results could also include pointers to native applications where they are available.

Referring to FIG. 1, a mobile wireless communication device utilizes a geospatial location to request a web application from a web application server according to one embodiment of the invention. The mobile wireless communication device utilizes a geospatial mapping system as illustrated with three overlaid maps labeled A102, B104, and C106 as shown. The mobile wireless communication device is located at a certain point 108 in the first geospatial map labeled A 102, and at the same time at a location 110 in the second geospatial map labeled B 104, and also at a location 112 in the third geospatial map labeled C 106. It should be noted that although three overlaid maps labeled A 102, B 104, and C 106 are shown in FIG. 1, any number of overlaid maps can be implemented in a geospatial mapping system for use in various embodiments of the present invention.

In the present example, the first geospatial map labeled A 102, represents a map of the inside of the a retail store such as a <Store Name> retail store. The second geospatial map labeled B 104 represents a shopping mall in which the <Store Name> store is located. The third geospatial map labeled C 106 represents a particular suburb of a city. As can be appreciated from the overlaid three maps A 102, B 104, and C 106, the user with the wireless communication device can be requesting a web application and related service for the particular location of the user relative to one of the three geospatial maps A 102, B 104, C 106. The geospatial location identified by the wireless communication device, along with other specified information in the request, provides information to a web application server to be able to respond to a user's request for web application. The response would be specific to a geospatial location corresponding to a specific geospatial location identified in the request from the user.

According to the present example, the web application server may process a request from the user with the client communication device that requests an inventory inquiry application specific for the particular <Store Name> store indicated by the geospatial location 108 of the user included in the request to the server. The web application server, according to the present example, can process the request and respond with a web application 116 that is located a specific URL for the particular <Store Name> store.

The specific URL of the application 116 is not necessarily a top level domain name or top level URL 114, such as www.storename.com. The URL and optionally the application sent in the response to the client wireless communication device is specific to the particular <Store Name> store in which the user is located at the location 108 in the first geospatial map 102. As can be appreciated, the specific URL associated with the location specific application for the user at the location 108 can be a low level URL that is many levels down from a top level URL for the <Store Name> Corporation at the top level URL 114.

The web application server can provide to the client wireless communication device 202 the low level URL, and optionally other information for the web application, where the client wireless communication device can locate the geospatial-location-specific web application. Alternatively, the web application server can provide the geospatial-location-specific web application 116 as part of the response to the request from the client wireless communication device. Other combinations of web application and related information, including information about geospatial-location-specific services related to the geospatial-location-specific web application, can be provided in a response to the request from the client wireless communication device.

Optionally, the web application server can provide identification of, or copies of one or more alternative geospatial-location-specific web applications associated with geospatial-location-specific services that are both specific to a geospatial location corresponding to the current geospatial location for the user mobile device, a nearby location to the location of the user (e.g., within a defined nearby vicinity area of the current geospatial location of the mobile device), and detailed descriptions of the services and the web applications that meet the criteria for the user's request, or any combination of the above. For example, a response message to the client wireless communication device may contain an ID for the message, a description of the web application and optionally related services, street address information for the geospatial location in the request, and a URL of the entity or source offering the web application and related services. These and other information can be included in the response to the request from the client wireless communication device at the particular geospatial location 108. In this example, the user receives an inventory application where the user may be able to make specific inquiries about availability of product in a particular <Store Name> store in which the user is shopping at the present time.

As a second alternative, the request from the client wireless communication device may identify the geospatial location 110 in the second geospatial map B 104. This inquiry in a request sent to the web application server may request a web application and related services pertaining to the particular shopping mall in which the user is currently located. For example, the user may request a locator application that can locate the stores at the shopping mall that sell shoes.

As a third alternative, the request from the client wireless communication device may identify the geospatial location 112 in the third geospatial map C 106. In this context, the request from the client wireless communication device may be inquiring regarding the particular portion of the city in which the user is currently located. For example, the user may request a Taxi locator web application that would allow the user to coordinate with a nearby Taxi service to pick them up when they are done shopping at the particular mall in the city location indicated by the geospatial location 112. In this case, the web application server may include in a response to the request a web application for locating Yellow Cabs specific to the particular section of the city near the geospatial location 112 of the user as identified in the request. The particular web application 124 may be identified by a specific low level URL that is much lower than a top level URL 122 for the Yellow Cab company. The response, according to this example, immediately responds with either the specific web application meeting the criteria of the request from the geospatial location 112, or the low level URL 124 for the specific web application, or both.

It should be noted, that a response to the request from the geospatial location 110 in the second geospatial map B 104, can include a web application 120 with a low level URL that identifies the location in a particular server where the location specific web application 120 may be found. This low level URL 120 can be much lower that a top level URL 118 for the mall management company. For example, if the particular mall management company is Simon malls and a top level URL would be www.simonmalls.com, the low level URL can be much lower than that top level URL identifying the specific location of the web application that is particular to that Simon mall identified in the second geospatial map B 104.

Figure 2:
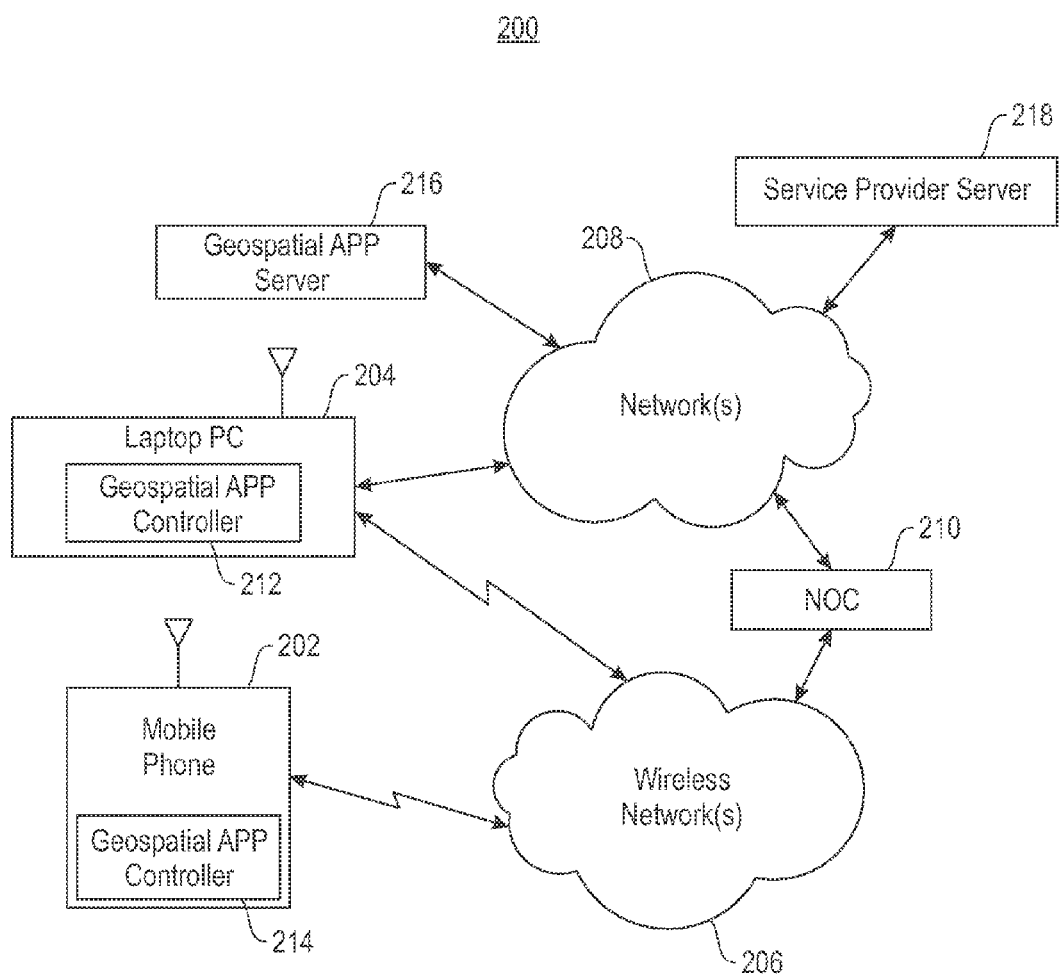
FIG. 2 is a block diagram of an example communication system according to an embodiment of the invention.

Referring to FIG. 2, an example of a communication system 200 that can provide an environment for an example of an embodiment of the present invention is illustrated. The communication system 200 includes a wireless communication device such as a mobile phone 202. Alternatively, the wireless communication device can be embodied in a lap top PC 204 that is equipped with a wireless communication transceiver (not shown in FIG. 2).

The mobile phone 202 and the lap top PC 204 are in wireless communication with one or more wireless communication networks 206 as shown, and can send messages and receive messages via the wireless communication networks 206. The one or more wireless communication networks 206, according to the present example, are managed through a network operating center (NOC) 210 (also referred to as a server system 210 or a server 210). The NOC 210 includes one or more information processing systems, memory storage systems, communication interfaces, and administrative and technical personnel user interfaces. The NOC 210 provides control for the one or more wireless communication networks 206, and also is a gateway for messaging between the network 108 and the wireless communication network 206. The network operating center 210 can be communicatively coupled with one or more networks 208, such as any single or a combination of local area network, wide area network, the internet or world wide web, or other networks.

As shown in the example in FIG. 2, the lap top PC 204 is also communicatively coupled with the one or more networks 208, and can send messages and receive messages via the networks 208. For example, the networks 208 may include the internet. According to the present example, the mobile phone 202 and the lap top PC 204 each includes a geospatial application controller 214, 212 respectively. The geospatial application controller 212 in the lap top PC 204 can be used by the lap top PC 204 to manage requests and responses communicated with a geospatial application server 216 that is communicatively coupled with the networks 108, as shown.

The geospatial application controller 214 in the mobile phone 202 can be used by the mobile phone 202 to manage requests and responses communicated with the geospatial application server 216, as shown.

While the geospatial application server 216 may directly provide a web application in a response to a request from either the geospatial application controller 214 in the mobile phone 202 or the geospatial application controller 212 in the lap top PC 204, the geospatial application server 216 can provide either alternatively, or in addition to providing a copy of the web application, the specific low level URL where a copy of the web application may be located at the particular service provider server 218 that is communicatively coupled with the network 208 as shown. That is, in one embodiment of the invention, the geospatial application server 216 responds with the URL for the specific location on the network 208 at the particular service provider server 218 where the client wireless communication device can find the location specific web application identified in the request to the geospatial application server 216.

Figure 3:
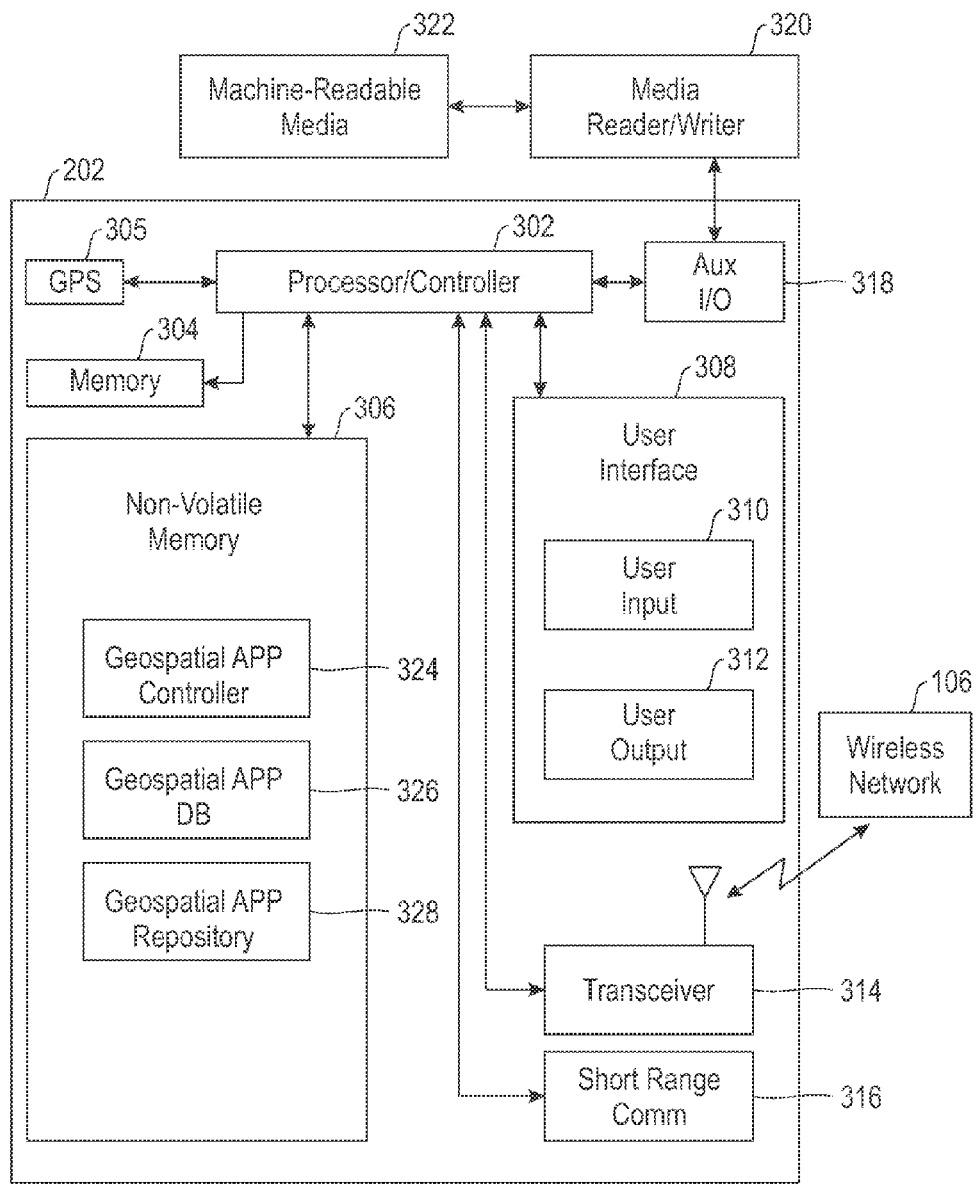
FIG. 3 is a block diagram illustrating an example of the mobile phone device shown in FIG. 2.

Referring to FIG. 3, one example of a client wireless communication device, such as the mobile phone 202, is shown. While the present discussion is generally directed at a detailed block diagram of the mobile phone 202, many of the components illustrated in FIG. 3 may be similarly found in other types of electronic devices, such as the laptop PC 204 shown in FIG. 1.

The mobile phone 202, in this example, includes a processor/controller 302 communicatively coupled with memory 304. The processor/controller 302 is also communicatively coupled with a GPS receiver 305. The GPS receiver 305 provides location information that can be used by the geospatial application controller in the mobile phone 202 according to various embodiments of the present invention. The processor/controller 302 is communicatively coupled with non-volatile memory 306 that can store program, data, and configuration parameters in permanent storage, as will be discussed in more detail below. For example, stored in the non-volatile memory 306 are several programs and data that interoperate with the processor/controller 302 to provide features and functions of the mobile phone 302 according to various embodiments of the present invention.

The processor/controller 302 is communicatively coupled with a user interface 308 that includes user input interface 310 and user output interface 312. The user input interface 310 can include, according to various examples, a keyboard, a touch screen, a touch pad, a key pad, a microphone and other user input devices. The user output interface 312 can include a display for displaying information to a user of the mobile phone 202, a speaker for providing audible information and signals to a user, and one or more indicators that can include visual indication, audible indication and tactile indication signals to the user. The processor/controller 302 is communicatively coupled with a transceiver 314 that can wirelessly communicate with the wireless network 206. The mobile phone 202 using the wireless transceiver 314 can communicate voice signals and data signals with the wireless network 206. The processor/controller 302 is communicatively coupled with a short range communication module 316. The short range communication module 316 can include different technologies to facilitate short range communication with nearby communication devices. For example, the short range communication module 316 can include any short range wireless technology such as, but not limited to, BLUETOOTH®, ZIGBEE®, and Near Field Communication (NFC) technologies, or using WIFI, or by other means.

The processor/controller 302 is communicatively coupled with an auxiliary input/output interface 318 that allows the processor/controller 302 to communicate with a media reader/writer 320 that can read data, and optionally write data, with a machine readable media 322. The media reader/writer device 320 can include one or more of the following technologies: CD, DVD, floppy drive, optical drive, removable media drive, and the like. Machine readable media 322 can be coupled with the media reader/writer 320 such that the media reader/writer 320 can read information from (and optionally write information to) the machine readable media 322.

According to the present example, the non-volatile memory 306 includes the geospatial application controller 324. The geospatial application controller 324 can interoperate with the processor/controller 302 to provide control functions and features according to various embodiments of the present invention for managing access to geospatial location specific applications and related services. The non-volatile memory 306 includes a geospatial data base 326 that stores information associated with requests and responses for geospatial location specific applications and related services. The non-volatile memory 306 includes a geospatial application repository 328 that can store one or more geospatial-location-specific applications for use by the mobile phone 202, according to various embodiments of the present invention.

Figure 4:
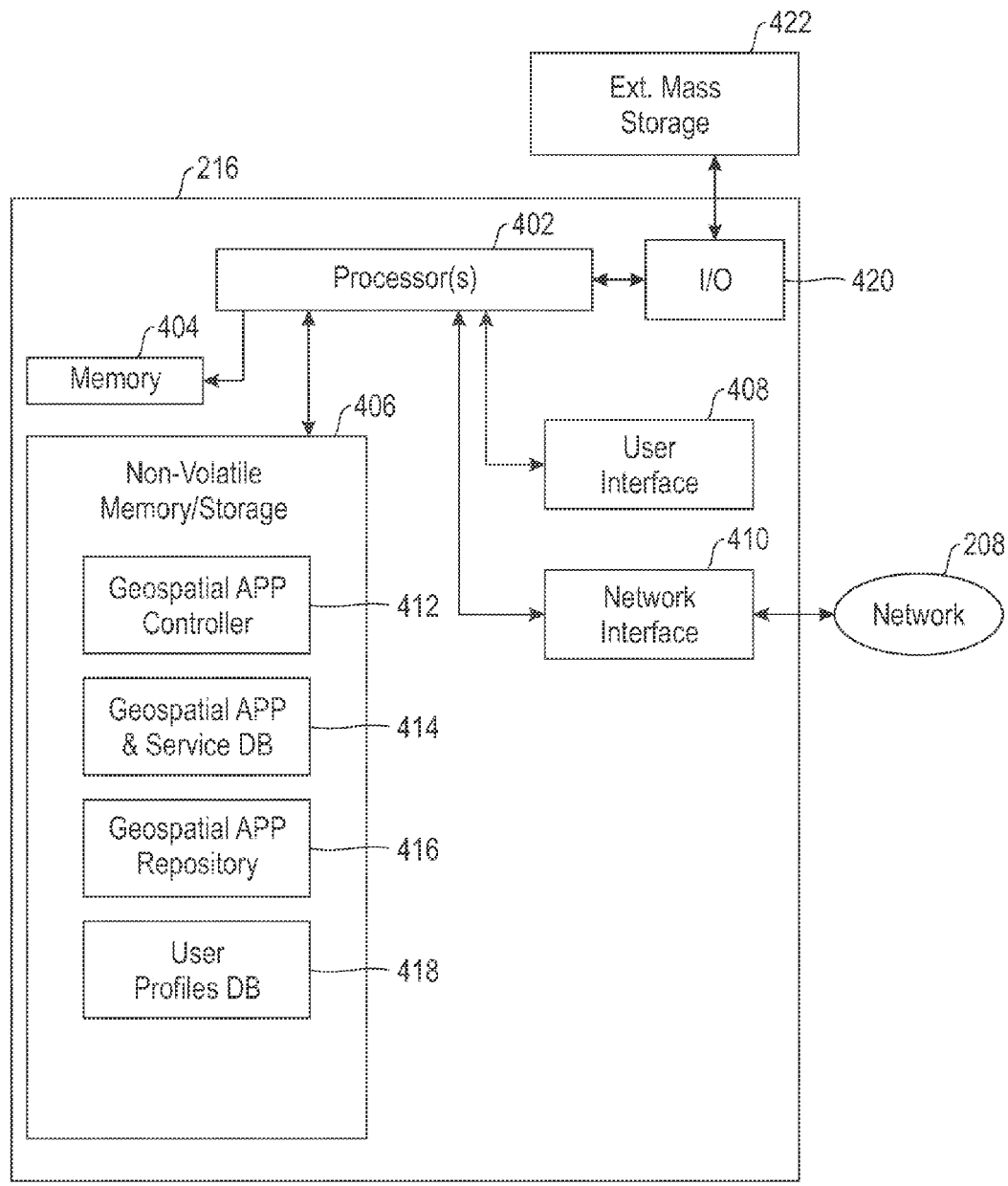
FIG. 4 is a block diagram illustrating an example of the geospatial application server shown in FIG. 2.

Referring to FIG. 4, a geospatial application server 216 is shown according to one embodiment of the present invention. The server 216 includes one or more processors 402 that are communicatively coupled with memory 404 and with non-volatile memory/storage 406. The non-volatile memory/storage 406 can store programs, data, and configuration parameters for the server 216. The processor 402 is communicatively coupled with the user interface 408.

The user interface 408 may include a user input interface (not shown) and a user output interface (not shown). The user input interface may include such input devices as keyboard, mouse, touch screen, touch pad and microphone for audio input. The user output interface may include such output devices as one or more displays, indicators which may be audible, visible, or tactile as appropriate in particular applications. The user output interface may also include one or more speakers to provide audio output. The processor 402 is communicatively coupled with a network interface 410 which provides an interface to the external network 208 (see FIG. 2).

The processor 402 is communicatively coupled with another input/output interface 420 that provides various interfaces to external devices. For example, an external mass storage device 422 can be communicatively coupled via the input/output interface 420 with the server 216 to provide external storage for the server 216.

The non-volatile memory/storage 406, according to the present example, includes a geospatial application controller 412, which interoperates with the one or more processors 402 to provide functions in the server 216 according to various embodiments of the present invention as will be discussed below. The non-volatile memory/storage 406 includes a geospatial application and service data base 414, which can be referred to by the geospatial application controller 412 to store and track information related to geospatial applications and related services, as will be discussed below.

The non-volatile memory/storage 406 includes a geospatial application repository 416 where it can be stored one or more geospatial applications. These stored geospatial applications can be provided to client devices that are requesting such applications from the server 216, as will be discussed below.

The non-volatile memory/storage 406 includes user profiles data base 418, which keeps track of the profiles of individual users that are associated with the server 216. For example, a user with a client mobile device that can request geospatial applications and related services from the server 216 would include at least one record for that user in the user profiles data base 418.

A more detailed view of one example of the geospatial application and service data base 414 is shown in FIG. 5. According to the present example, each record in the geospatial application and service data base 414 includes various fields as shown. A field identifying one or more geospatial locations 502 associates a particular record with an application and related service to these geospatial locations 502. The record may include an application ID 504, a service ID 506, an application description 508, and a service description 510. The application description may include details of the application and related information. These details of the application description 508 can be meaningful to a user of a client device such as the mobile phone 202, in deciding whether to select the particular application.

Similarly, the service description 510 provides detailed description of the service that may be related to an application for the particular record stored in the geospatial application and service data base 414. An application location pointer 512 may include location information such as a direct low level URL for the particular application. The application location pointer 512 may use other than URL information to point to a location for the particular application. A service location field 514 identifies an address or other form of location identification where the service is provided. The source of application 516 identifies the entity or store or other source for the application. The source of services field 518 identifies who provides the particular services associated with that record in the geospatial application and service data base 414.

A popularity field 520 can be included in a record to identify how popular a particular application and related services is to users of the application and related services. This popularity information is typically an aggregate popularity for all users, according to the present example. However, other forms of identifying popularity for a particular record may be implemented in alternative embodiments of the present invention. For example, the popularity 520 can be specified relative to time of day, day of the week, day of the month, or other particular date or event that would be associated with a popularity measurement. A rating field 522 may be included in a record to identify how users are rating the particular application and related services. This geospatial application and service data base 414 may include multiple records 530, 532, 534, 536 for different location specific applications and related services. The server 216, in response to request for a geospatial location-specific application and related service searches the database 414 to find records identifying geospatial-location-specific application and related service that match the request criteria.

Figure 6:
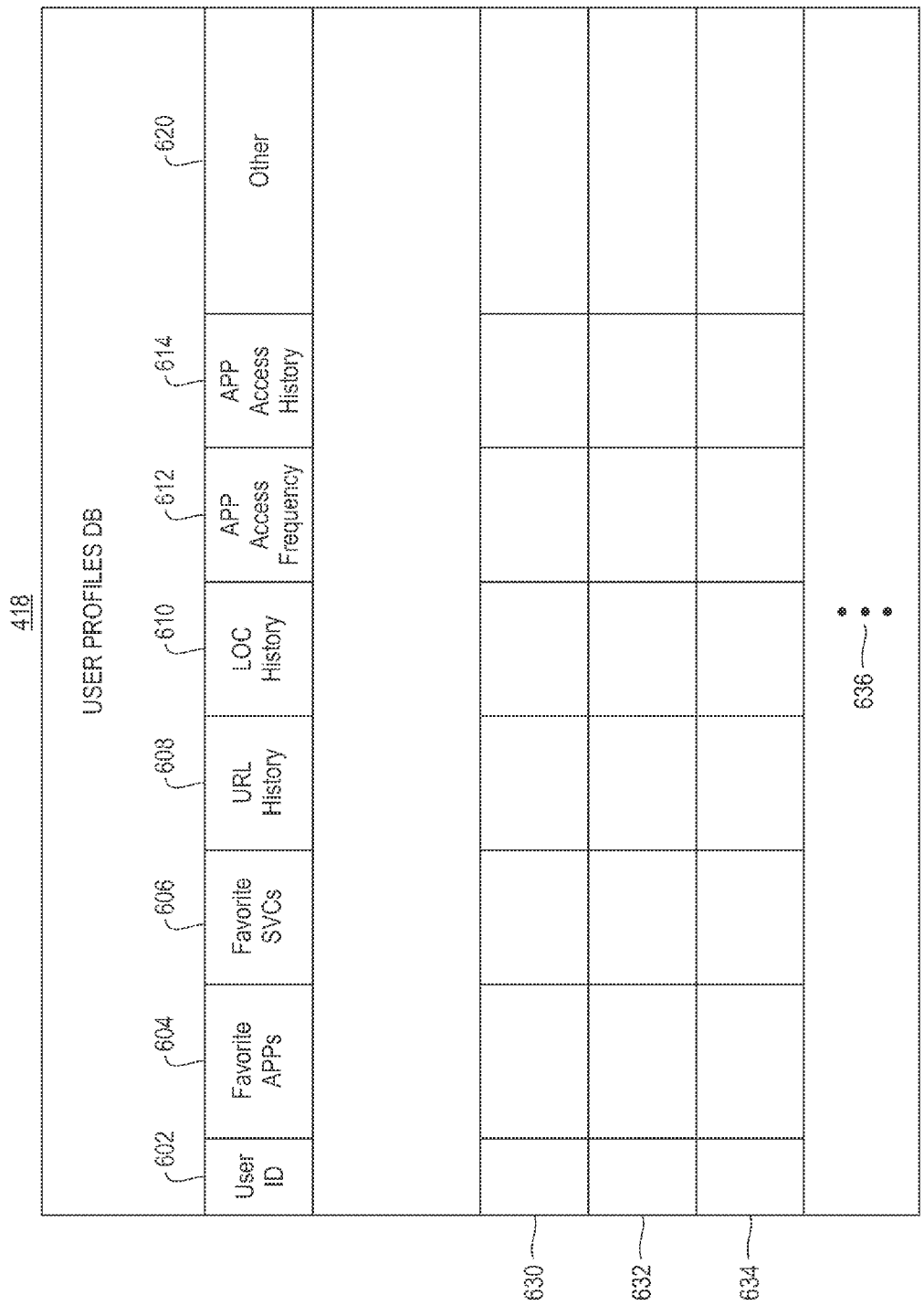
FIG. 6 is a more detailed view of the example user profiles database shown in FIG. 4.

Referring to FIG. 6, an example of a more detailed view of the user profiles data base 418 is shown. Each record in the user profiles data base 418 is associated with a particular user of the communication system 200. A user ID field 602 identifies the particular user associated with that record.

The user's favorite rating for one or more apps can be stored in a field 604 as shown. The user's favorite rating for one or more services can be stored in a field 606 in the user's record.

A URL history field 608 identifies the various URLs that have been accessed by the user associated with a particular record. This URL history 608 can track the most recent accesses to particular URLs for the user.

A location history field 610 can track the user's most recent locations while using the communication system 200. Other location history may also be stored in the location history field 610 for the particular user.

An application access frequency field 612 keeps track of what applications and how frequently they have been accessed by the user. An application access history field (or access recency field) 614 keeps track of what applications have been most recently accessed by the user. Other information 620 may be stored in the user's record as shown. The data base 418 includes multiple records 630, 632, 634, 636 for several users of the communication system 200.

Referring to FIG. 7, a more detailed view of an example of the geospatial application data base 326 is shown. This geospatial application data base 326 is carried on the client's mobile device 202 to keep local information in the device 202. This data base 326 includes records for the various applications and related services that have been accessed by the user of the device.

In the example shown, there are several records 730, 732, 734, of accessed applications and related services. Each record may include an application ID field 702, a service ID field 704, and geospatial location or locations field 706. The geospatial locations field 706 identifies the relevant geospatial locations that are associated with the location specific application and related services. An application description field 708 and a services description field 710 describes in detail the application and the services.

A favorite ranking field 712 includes rank information for the particular application and related services for the user. This may identify how favorite the application is to the user.

The URL field 714 identifies a pointer to a location for a source of the particular application, e.g., a web site or server or the like, where the application may be found as necessary. The application source field 716 and the services source field 718 describe the details of the identification of the sources of the application and the services associated with the particular record.

The application access frequency field 720 identifies an access frequency for the user requesting the particular application. An application access history field 722 keeps track of the most recent accesses to the particular application by the user.

FIG. 8 shows an example of a request message that can be sent by a client's mobile device 202 to the remote server 216. The request message 800 includes a header 802 for the message packet with the required administrative information for delivering the message through the communications system 200 to the destination server 216. The request message 800 includes geospatial location information field 804. This information field 804 includes a representation of the current geospatial location for the client mobile device 202. The request message 800 also includes a request for receiving at least one geospatial-location-specific application associated with a geospatial-location-specific service that are both specific to a geospatial location corresponding to the current geospatial location of the client mobile device 202.

The request message 800, for example, includes a device ID 806 that identifies the user and client mobile wireless device 202 to the server 216. A time stamp 808 is included in the message 800 to indicate, for example, the current time when the request is being made by the user using the client mobile wireless device 202. The time stamp 808 may alternatively indicate a time when the message 800 was sent by the client mobile wireless device 202. In the present example, the time stamp information 404 indicates the time that a particular message was sent.

An application ID 810 may be included in the message 800 to identify the particular application being requested by the message 800. An application description field 812 may be included in the message 800 to describe the details of the application being requested by the message 800.

A services ID field 814 may be included in the message 800 to identify the services being requested by the message 800. A service description field 816 may be included in the message to describe in detail the services being requested by the message 800. An application source field 818 may be included in the message 800 to request a particular application source for the application being requested by the message 800. A services source field 820 may be included in the message 800 to identify a particular source of services being requested by the message 800.

Referring to FIG. 9, a response message 900 is shown according to one example. The response message 900 includes a header field 902 that provides necessary administrative information for delivering the response message across the communication system 200 to the destination client mobile device 202. The response message 900 includes an application ID field 904 that identifies, for example, a particular geospatial-location-specific application associated with a geospatial-location-specific service that are both specific to a geospatial location corresponding to the current geospatial location of the mobile device 202, such as both being specific to the current geospatial location of the mobile device 202 and/or to a geospatial location that is within a defined nearby vicinity area of the current geospatial location of the mobile device 202. The response message 900 may include an application description field 906 that describes in detail the application associated with the message 900.

The response message can include a description of a use of the geospatial-location-specific application. The description of the use of the application can be presented via a display. This description of use of the application can assist a user of the portable wireless communication device 202 in using the application associated with the response message received by the portable wireless communication device 202. The response message can include a description of a use of the geospatial-location-specific service. The description of the use of the service can be presented via a display.

A services ID field 908 may be included in the message 900 and a services description field 910 also may be included in the message 900. The services ID field 908 identifies the particular geospatial-location-specific services associated with the response message 900 and the services description field 910 describes the services in detail. A URL field 912 may be included in the response message 900 to point to a particular location where the application may be found. Other types of application location information may be used in this field 912 to identify the location of an application where it could be found.

An application source field 914 may be included in the response message 900 to identify the source of the particular application being responded within the response message 900. A services source field 916 may be included in the response message 900 to identify the particular source of services associated with the response message 900. An application software code 918 may be included in the response message 900 to provide the geospatial-location-specific application, or a portion thereof, that can be executed at the client's mobile device 202 as necessary to invoke the features and functions of the application.

Figure 10:
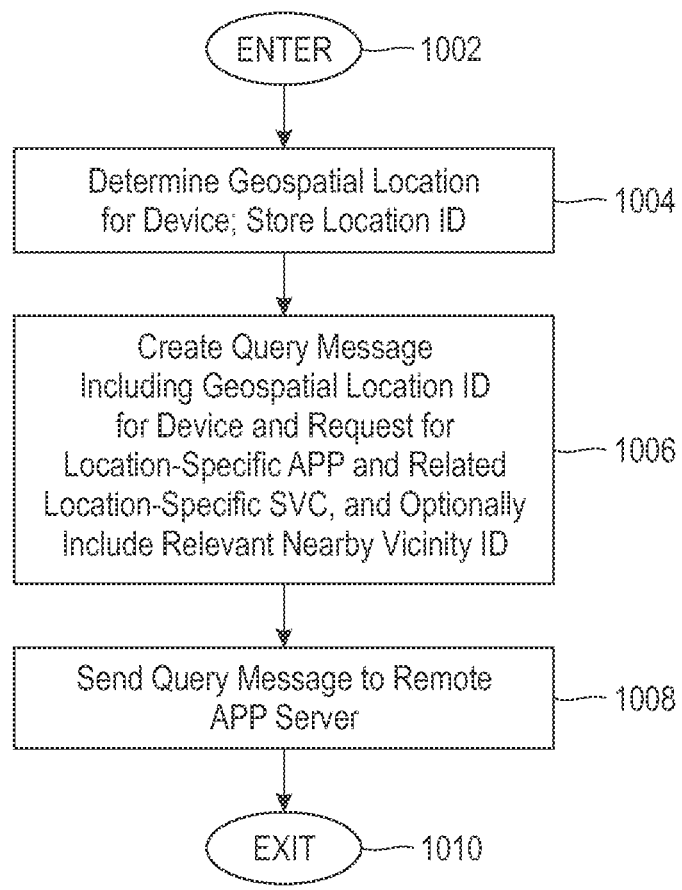
FIGS. 10 and 11 are flow diagrams illustrating various operational flow sequences for a wireless communication device in the communication system of FIG. 2, in accordance with various examples.
Figure 11:
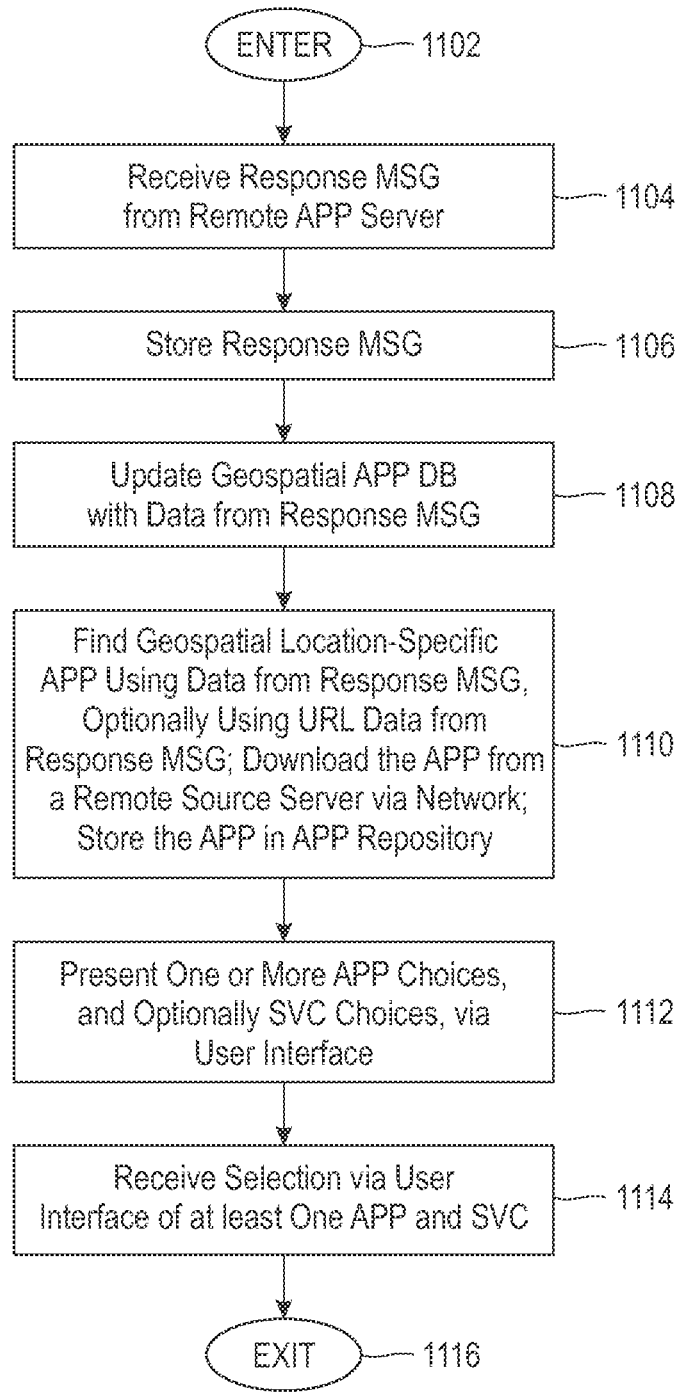
Figure 12:
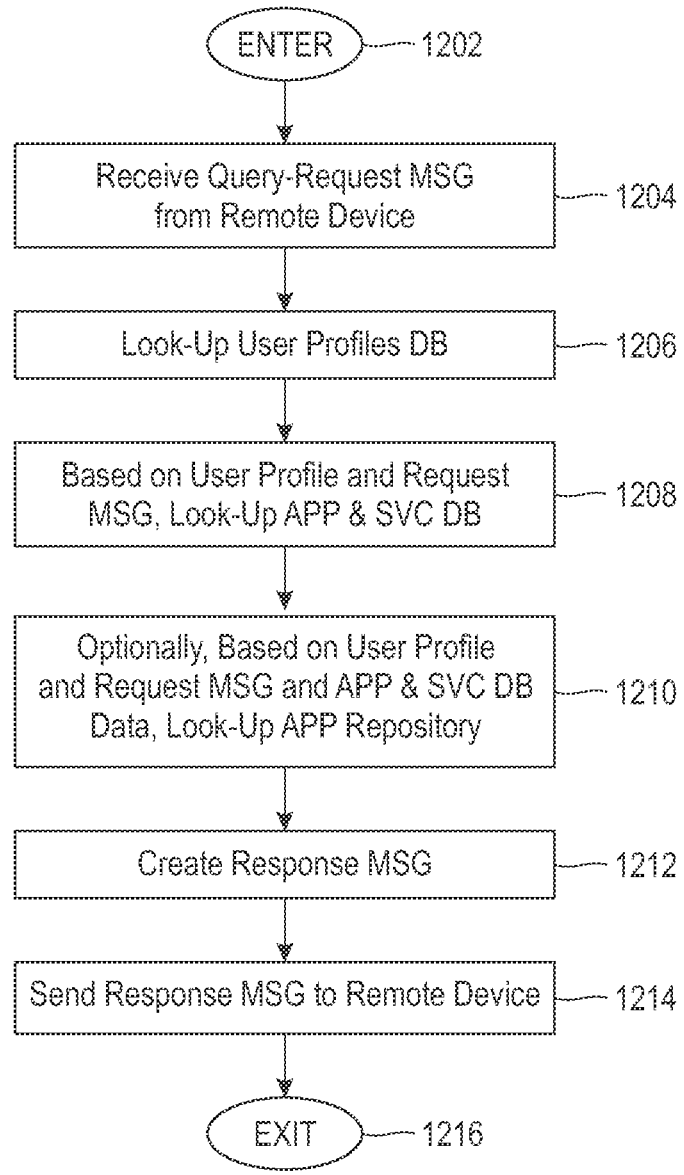
FIG. 12 is a flow diagram illustrating various operational flow sequences for an application server in the communication system of FIG. 2, in accordance with various examples.

FIGS. 10, 11, and 12 are flow diagrams illustrating example message communications of request messages and response messages between the client mobile device 202 and the remote server 216. FIGS. 10 and 11 show example operations at the client mobile wireless communication device 202. FIG. 12 shows example operations at the remote geospatial application server 216. These flow diagrams illustrate the architecture, functionality, and operation of possible implementations of systems, methods, and computer program products according to various embodiments herein. In this regard, each block in a flow diagram may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently (or contemporaneously), or the blocks may sometimes be executed in the reverse order, depending upon the functionality involved. It will also be noted that each block of the flow diagram illustration, and combinations of blocks in the flow diagram, can be implemented by special purpose hardware-based systems that perform the specified functions or acts, or combinations of special purpose hardware and computer instructions.

Referring to FIG. 10, the client's mobile device enters an operational sequence 1002, and then proceeds, at step 1004, to determine geospatial location for the device and then stores the determined geospatial location identified in a memory location. The geospatial application controller 324 interoperates with the processor/controller to create a query message (request message), at step 1006. The request message includes geospatial location identification for the device and a request for location specific application and related location specific services. Optionally, the query request message may include identification of relevant nearby vicinity that can be searched by the server 216 to find requested one or more location specific applications and related location specific services. The geospatial application controller 324 sends, at step 1008, the created request message to the remote application server 216. That is, the request message is destined for reception by the remote server 216. For example, the header 802 in the message 800 (see FIG. 8) will include address information and other related information to allow the communication system 200 to deliver the message 800 to the destination remote server 216. The operational sequences then exited, at step 1010.

Referring to FIG. 11, the geospatial application controller 324 enters the operational sequence, at step 1102, and proceeds to receive a response message from the remote application server 216, at step 1104. The geospatial application controller 324, at step 1106, stores the response message in memory 304. At step 1108, the geospatial application controller 324 updates geospatial application data base 326 with data from the response message.

According to the present example, the geospatial application controller 324, at step 1110, uses data from the response message to find the geospatial location specific application, such as by using URL data from the response message to locate a web application at a remote service provider server 218 (see FIG. 2). The geospatial application controller 324 also downloads the location specific application from the remote server 218 and stores the application in the application repository 328. In this way, the response message from the geospatial application server 216 enables the client mobile wireless communication device 202 to find one or more geospatial-location-specific applications and related geospatial-location-specific services based on the data received in the response message. The response message was sent from the remote application server 216 in response to the query request message from the client mobile wireless device 202.

Based on the stored data from the response message, and the stored application and the application repository, the geospatial application controller 324, at step 1112, presents one or more application choices and optionally service choices, via the user interface 308. For example, the display in the user output interface 312, allows the mobile phone 202 to present information by displaying the information to the user.

Figure 13:
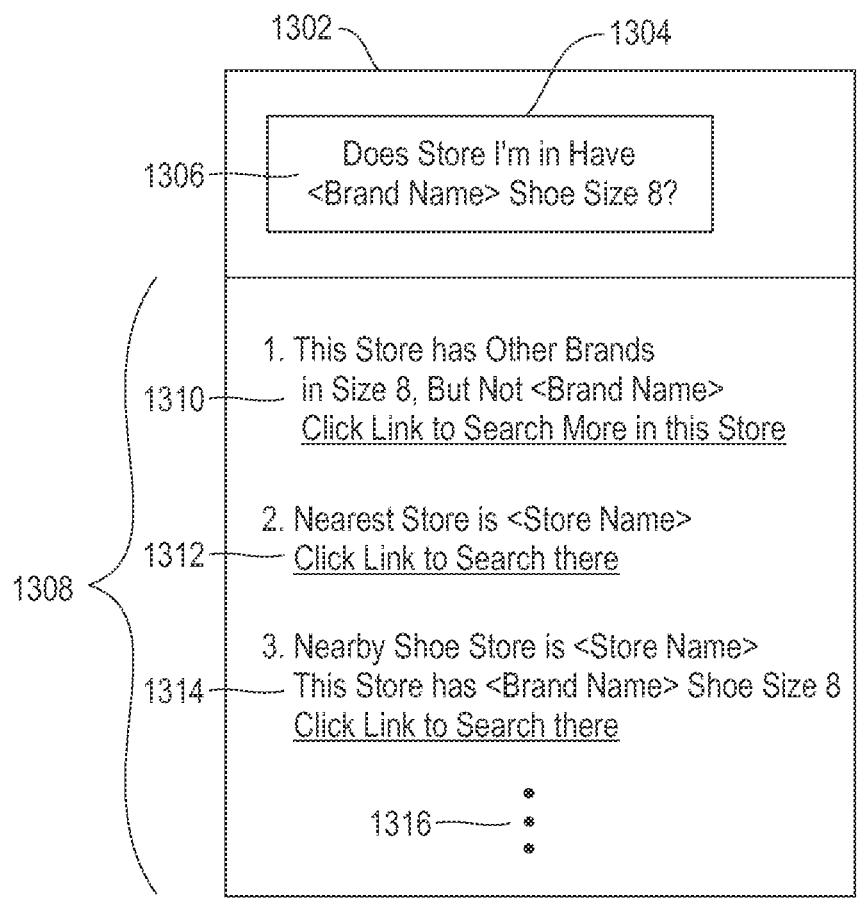
FIG. 13 is a diagram showing an example of a display user interface according to various embodiments of the invention.

An example of such an interface is shown in FIG. 13. The display 1302, according to the present example, is segmented into 2 display sections. A query formation box 1304 allows the user, using the user input interface 310, to enter a query message 1306 as shown in FIG. 13. In a separate section in the display 1302, the geospatial application controller 324 can provide one or more search results 1308 which are relevant to the query 1306 entered by the user in the query box 1304.

In the current example, the user has entered a query requesting whether the <Store Name> store that the user is in has a certain brand of shoes size eight. The search results 1308 include at least 3 possible choices for the user to select. A first choice 1310 is the most relevant choice to the user responding to the specific query in the query box 1304. The first choice 1310 informs the user that this <Store Name> store has other brands in size 8, but not the particular brand that the user is requesting. The response message further gives a clickable link for the user to invoke the particular inventory search application for the <Store Name> store in which the user is located at the present time. If the user wishes to search further in the <Store Name> store, the user can click the link by placing the cursor over the link with the underlying text and clicking a selection button to select that particular link.

According to the present example, the geospatial application controller 324 can provide additional responses for location specific applications and related services that are in the near vicinity area to where the user with the mobile phone 202 is currently located. For example, the second choice 1312 informs the user that the nearest shoe store is a certain brand of shoe store, and allows the user to click a link to search the inventory of that particular shoe store. That shoe store may be very close to the <Store Name> store in the particular shopping mall that they are both located in.

A third choice 1314 that is presented to the user informs the user of a nearby shoe store with a certain shoe store name and informs the user that this shoe store has the certain brand of shoes in the size that the user is looking for. The user may be also informed of the area defined as the vicinity and how far away this particular store is from the current location that the user is in. Additionally, the user is presented with a clickable link to the particular location specific application for searching the inventory at that nearby store. Other choices 1316 may be provided to the user and the user can simply scroll the possible choices from the first choice to a maximum number choice to review the search results. The user can select one or more of the choices displayed on the display 1302. In this way, the user is provided with a location specific application for the particular <Store Name> store that the user is in as well as access to location specific applications for searching other shoe stores in the near vicinity to the location where the user currently is in.

Returning to FIG. 11, after the geospatial application controller 324 presents, via the display in the user output interface 312, one or more application choices and optionally service choices, at step 1112, the geospatial application controller 324 monitors the user input interface 310 and receives a selection from the user, at step 1114, that selects at least one location specific application and related services. The operational sequence then exits, at step 1116.

Referring to FIG. 12, an operational sequence for the geospatial application server 216 is shown, according to one example. The geospatial application controller 412 in the server 216 enters the operational sequence, at step 1202, and proceeds to receive the query request message that was sent from the remote client mobile wireless communication device 202, at step 1204. The geospatial application controller 412 does a look-up operation in the user profile's data base 418 to attempt to locate information associated with a particular user and the remote mobile wireless communication device 202 that sent the request message to the server 216.

Based on data found for the particular user in the user profile data base 418 and data from the request message that was received by the server 216, the geospatial application controller 412 does a search in the application and services data base 414. The geospatial application controller 412 searches the one or more records of geospatial location-specific applications and related services that are relevant to the particular request in the request message received from the remote mobile wireless communication device 202. That is, the geospatial application controller 412 searches to find search results that include at least one candidate geospatial-location-specific application and associated geospatial-location-specific service that matches the request in the request message. According to certain embodiments of the invention, the geospatial application controller 412 can filter search results to find records that match certain specified search criteria, such as, but not limited to, proximity of the geospatial location of the candidate geospatial-location-specific application to the current geospatial location of the requesting mobile device 202, favorite ranking of the candidate geospatial-location-specific application for the user of the mobile device 202, frequency of access of the candidate geospatial-location-specific application by the user, recency of access of the candidate geospatial-location-specific application by the user, public popularity of the candidate geospatial-location-specific application, rating of the candidate geospatial-location-specific application, and other search criteria.

Optionally, the geospatial application controller 412, at step 1210, will look up in the application repository 416 for one or more geospatial location specific applications based on the data from the user profile for the particular user and the remote wireless communication device 202, and based on the data in the request message, and data in the one or more records found in the application and services data base 414 that are relevant to the request message.

Based on the look-up data for the particular request message received from the remote mobile wireless communication device 202 the geospatial application controller 412 creates a response message, at step 1212. Optionally, the response message may include one or more location specific applications with their software code that can be executed at the remote mobile phone 202. The geospatial application controller 412, at step 1214, sends the response message to the remote client wireless communication device 202 via the network interface 410 and network 208. That is, the response message is destined for reception by the remote client wireless communication device 202. For example, the header 902 in the message 900 will include address information and other related information to allow the communication system 200 to deliver the message 900 to the destination remote client wireless communication device 202. The geospatial application controller 412 then exits the operational sequence, at step 1216.

The present subject matter can be realized in hardware, software, or a combination of hardware and software. A computer system can be realized in a centralized fashion in one computer system, or in a distributed fashion where different elements are spread across several interconnected computer systems. Any kind of computer system—or other apparatus adapted for carrying out the methods described herein—is suitable.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present specification may describe components and functions implemented in the embodiments with reference to particular standards and protocols, the disclosure is not limited to such standards and protocols. Each of the standards represents an example of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Alternative Embodiments of the Present Disclosure

A) According to various embodiments of the present disclosure, a mobile device comprises: memory; at least one wireless transceiver for wirelessly communicating in a wireless communication system; a user interface for communication with a user of the mobile device; a processor/controller, communicatively coupled with the memory, the at least one wireless transceiver, and the user interface; and a geospatial application controller, communicatively coupled with the processor/controller, the memory, the at least one wireless transceiver, and the user interface, the geospatial application controller being configured to: determining a current geospatial location of the mobile device; storing a representation of the current geospatial location in the memory; sending, with the at least one wireless transceiver, a query message into a wireless communication system, the query message being destined for reception by a remote application server, the query message including the representation of the current geospatial location and a request for receiving, with the mobile device, at least one geospatial-location-specific application associated with at least one geospatial-location-specific service, both the geospatial-location-specific application and the geospatial-location-specific service being specific to the geospatial location of the mobile device; receiving, with the at least one wireless transceiver, a response message sent from the remote server and being destined for reception by the mobile device, and the response message including at least one of: identification of at least one candidate geospatial-location-specific application associated with at least one geospatial-location-specific service, both being specific to at least one of the current geospatial location of the mobile device and to a geospatial location within a defined nearby vicinity area of the current geospatial location of the mobile device, and a uniform resource locator (URL), lower than a top level domain uniform resource locator (TLD URL), associated with a network location of an instance of the at least one candidate geospatial-location-specific application; and presenting, via the user interface, to a user of the mobile device at least one user-selectable choice corresponding to at least one of the identification of the at least one candidate geospatial-location-specific application and the URL, the at least one user-selectable choice being selectable via the user interface by the user to request receiving, with the mobile device, a copy of the corresponding at least one candidate geospatial-location-specific application.

B) The mobile device of A), wherein the determining comprises: receiving, with the processor/controller of the mobile device, sensor information from at least one sensor associated with the mobile device, the determining of the current geospatial location of the mobile device being based at least on the sensor information.

C) The mobile device of B), wherein the mobile device comprises the at least one sensor.

D) The mobile device of B), wherein the at least one sensor is external to the mobile device, and the sensor information from the at least one sensor being transmitted to, and received by, the mobile device contemporaneous with the mobile device being located at the current geospatial location.

E) The mobile device of A), wherein the response message including a description of a use of the at least one candidate geospatial-location-specific application, the presenting including displaying to the user the description of the use.

F) The mobile device of A), wherein the response message including a description of a use of the at least one geospatial-location-specific service, the presenting including displaying to the user the description of the use.

G) The mobile device of A), wherein the user interface comprises a display and a user input interface, and wherein the presenting comprises: displaying, with the display, a prioritized list including a set of user-selectable choices, each user-selectable choice in the list corresponding to at least one of the identification of the at least one candidate geospatial-location-specific application and the URL, each user-selectable choice in the list being selectable, via the user input interface, by the user to request receiving, with the mobile device, a copy of the corresponding at least one candidate geospatial-location-specific application.

H) The mobile device of A), wherein the user interface comprises a display and a user input interface, and wherein the presenting comprises: displaying, with the display, a prioritized list including a set of user-selectable choices, each user-selectable choice in the list corresponding to an identification of at least one candidate geospatial-location-specific application that is matched to at least one of a current geospatial location of the mobile device and a geospatial location within a defined nearby vicinity area of the current geospatial location of the mobile device, each user-selectable choice in the list being selectable, via the user input interface, by the user to request, with the mobile device, access to a geospatial location-specific application and related location-specific services.

I) The mobile device of A), wherein the user interface comprises a display and a user input interface, and wherein the presenting comprises: displaying, with the display, a list including a set of user-selectable choices of at least one of: candidate at least one location-specific application and related service specific to a current location of the user, and candidate location-specific applications and related services specific to a geospatial location that is within a defined nearby vicinity area of the current geospatial location of the mobile device; and displaying, with the display, a description of each location-specific application and related services in the list including the set of user-selectable choices.

J) An application server remotely located to a mobile device, both being communicatively coupled with a communication system, the application server comprising: memory; a processor; a geospatial application and service database, communicatively coupled with the memory and the processor; a geospatial application controller, communicatively coupled with the processor, the memory, and the geospatial application and service database, the geospatial application controller being configured to: receive, from the communication system, a request message destined for reception by the application server, the request message sent from the remotely located mobile device, the request message including: indication of a current geospatial location of the mobile device determined by the mobile device, and a request for at least one geospatial-location-specific application and associated geospatial-location-specific service that are both specific to the current geospatial location of the mobile device; search, with the geospatial application controller, the geospatial application and service database and based on the current geo spatial location of the mobile device and the request received in the request message, to find search results that include at least identification of at least one candidate geospatial-location-specific application and associated geospatial-location-specific service that matches the request in the request message; and send, into the communication system, a response message destined for reception by the remotely located mobile device, the response message including at least one of: an identification of a candidate geospatial-location-specific application associated with a geospatial-location-specific service that are both specific to the current geospatial location of the mobile device; and an identification of a candidate geospatial-location-specific application associated with a geospatial-location-specific service that are both specific to a geospatial location that is within a defined nearby vicinity area of the current geospatial location of the mobile device.

K) The application server of J), further comprising a geospatial application repository communicatively coupled with the geospatial application controller, the geospatial application controller looking-up for one or more candidate geospatial location specific applications in the geospatial application repository based on at least data in the request message, and wherein the response message including: a copy of the one or more candidate geospatial-location-specific applications associated with one or more geospatial-location-specific services.

L) The application server of J), wherein the geospatial application controller being further configured to: filtering the search, based on the current geospatial location of the mobile device, the request received in the request message, and a favorite ranking of the candidate geospatial-location-specific application for a user of the mobile device, to find in the geospatial application and service database search results that include at least identification of at least one candidate geospatial-location-specific application and associated geospatial-location-specific service.

M) The application server of J), wherein the geospatial application controller being further configured to: filtering the search, based on the current geospatial location of the mobile device, the request received in the request message, and a frequency of access to a candidate geospatial-location-specific application by a user of the mobile device, to find in the geospatial application and service database search results that include at least identification of at least one candidate geospatial-location-specific application and associated geospatial-location-specific service.

M) The application server of J), wherein the geospatial application controller being further configured to: filtering the search, based on the current geospatial location of the mobile device, the request received in the request message, and recency of access to a candidate geospatial-location-specific application by a user of the mobile device, to find in the geospatial application and service database search results that include at least identification of at least one candidate geospatial-location-specific application and associated geospatial-location-specific service.

N) The application server of J), wherein the geospatial application controller being further configured to: filtering the search, based on the current geospatial location of the mobile device, the request received in the request message, and on at least one of: popularity of a candidate geospatial-location-specific application by users of the candidate geospatial-location-specific application; and public rating of a candidate geospatial-location-specific application by users of the candidate geospatial-location-specific application, to find in the geospatial application and service database search results that include at least identification of at least one candidate geospatial-location-specific application and associated geospatial-location-specific service.

O) A computer program product for a mobile device that is remotely located to an application server, both being communicatively coupled with a communication system, the computer program product comprising: a non-transitory computer readable storage medium having computer readable program code embodied therewith, the computer readable program code comprising instructions for performing a method comprising: determining, with the mobile device comprising a processor coupled to memory, a current geospatial location of the mobile device; sending a request message into the communication system and destined for reception by the remote application server, the request message including a representation of the current geospatial location of the mobile device and a request for receiving, with the mobile device, at least identification of at least one geospatial-location-specific application associated with at least one geospatial-location-specific service, both the geospatial-location-specific application and the geospatial-location-specific service being specific to the current geospatial location of the mobile device; receiving, from the remotely located application server, a response message destined for reception by the mobile device, the response message including at least one of: identification of a candidate geospatial-location-specific application associated with a geospatial-location-specific service, both the candidate geospatial-location-specific application and the geospatial-location-specific service being specific to the current geospatial location of the mobile device; and identification of at least one candidate geospatial-location-specific application associated with a geospatial-location-specific service, both the candidate geospatial-location-specific application and the geospatial-location-specific service being specific to a geospatial location that is within a defined nearby vicinity area of the current geospatial location of the mobile device; and presenting, with a display of the mobile device, a list of user selectable choices prioritized by proximity of geospatial location associated with each candidate geospatial-location-specific application associated with a geospatial-location-specific service relative to the current geospatial location of the mobile device.

P) The computer program product of O), wherein the presenting comprises: presenting, with the display, the list of user selectable choices to a user further prioritized by at least one of: popularity of each candidate geospatial-location-specific application associated with a geospatial-location-specific service; and public rating of each candidate geospatial-location-specific application associated with a geospatial-location-specific service.

Q) The computer program product of O), wherein the presenting comprises: presenting, with the display, the list of user selectable choices to a user further prioritized by a favorite ranking of each candidate geospatial-location-specific application for the user of the mobile device.

R) The computer program product of O), wherein the presenting comprises: presenting, with the display, the list of user selectable choices to a user further prioritized by frequency of access to each candidate geospatial-location-specific application by the user of the mobile device.

S) The computer program product of O), wherein the presenting comprises: presenting, with the display, the list of user selectable choices to a user further prioritized by recency of access to each candidate geospatial-location-specific application by the user of the mobile device.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method, with a mobile device including a processor coupled to a memory, the mobile device being communicatively coupled with an application server, the method comprising:
determining a current geospatial location of the mobile device with respect to one of a plurality of overlaid geospatial maps where each of the plurality of overlaid geospatial maps corresponds to a different context for a request message to send to an application server, each context being different from the context of the other of the plurality of overlaid geospatial maps;
storing a representation of the current geospatial location in the memory;
sending a request message, from the mobile device to the application server, the request message including a representation of the current geospatial location of the mobile device with respect to one of the plurality of overlaid geospatial maps and a request for receiving at the mobile device at least one geospatial-location-specific application associated with a geospatial-location-specific service that are both specific to the current geospatial location of the mobile device;
receiving, from the application server, a response message including identification of at least one candidate geospatial-location-specific application associated with a geospatial-location-specific service that is specific to a geospatial location that is within a defined nearby vicinity area of the current geospatial location of the mobile device with respect to one of the plurality of overlaid geospatial maps; and presenting at a user interface associated with the mobile device a list of user selectable choices prioritized by proximity of geospatial location associated with each identified candidate geospatial-location-specific application associated with a geospatial-location-specific service relative to the current geospatial location of the mobile device with respect to one of the plurality of overlaid geospatial maps.

2. The method of claim 1, wherein the response message includes identification of at least one candidate geospatial-location-specific application associated with a geospatial-location-specific service that are both specific to the current geospatial location of the mobile device.

3. The method of claim 1, wherein the presenting comprises:
displaying the list of user selectable choices at the user interface, the list being further prioritized by at least one of:
popularity of each identified candidate geospatial-location-specific application associated with a geospatial-location-specific service; and
public rating of each identified candidate geospatial-location-specific application associated with a geospatial-location- specific service.

4. The method of claim 1, wherein the presenting comprises:
displaying the list of user selectable choices at the user interface, the list being further prioritized by
a favorite ranking of each identified candidate geospatial-location-specific application for a user of the mobile device.

5. The method of claim 1, wherein the presenting comprises:
displaying the list of user selectable choices at the user interface, the list being further prioritized by
frequency of access to each identified candidate geospatial-location-specific application by a user of the mobile device.

6. The method of claim 1, wherein the presenting comprises:
displaying the list of user selectable choices at the user interface, the list being further prioritized by
recency of access to each identified candidate geospatial-location-specific application by a user of the mobile device.

7. The method of claim 1, wherein the response message including:
a uniform resource locator (URL), lower than a top level domain uniform resource locator (TLD URL), associated with a network location of an instance of each identified candidate geospatial-location-specific application.

8. The method of claim 1, wherein at least one user-selectable choice in the list being selectable by a user of the mobile device to request receiving from an application server a copy of an identified candidate geospatial-location-specific application associated with the one user-selectable choice.

9. The method of claim 1, wherein the determining comprises:
receiving, with the processor, sensor information from at least one sensor associated with the mobile device, the determining of the current geospatial location of the mobile device being based at least on the sensor information.

10. The method of claim 9, wherein the at least one sensor is a component of the mobile device.

11. The method of claim 9, wherein the at least one sensor is external to the mobile device, the sensor information from the at least one sensor transmitted to the mobile device contemporaneous with the mobile device being located at the current geospatial location.

12. The method of claim 1, wherein the response message including a description of at least one of a use of each candidate geospatial-location-specific application and a use of the geospatial-location-specific service associated with the each candidate, the presenting including displaying at the user interface the description of the use.

13. A method, with an application server that is communicatively coupled with a mobile device, comprising:
receiving a request message from the mobile device, the request message including:
indication of a current geospatial location of the mobile device determined by the mobile device with respect to one of a plurality of overlaid geospatial maps where each of the plurality of overlaid geospatial maps corresponds to a different context for a request message to send to an application server, each context being different from the context of the other of the plurality of overlaid geospatial maps, and
a request for receiving at the mobile device at least one geospatial-location-specific application associated with a geospatial-location-specific service that are both specific to a geospatial location corresponding to the current geospatial location of the mobile device;
searching, based on the indication of the current geospatial location of the mobile device and the request received in the request message, in a geospatial application and service database to find search results that include identification of at least one candidate geospatial-location-specific application associated with a geospatial-location-specific service that matches the request in the request message; and
sending a response message destined for reception by the mobile device, the response message including identification of a candidate geospatial-location-specific application associated with a geospatial-location-specific service that is specific to a geospatial location that is within a defined nearby vicinity area of the current geospatial location of the mobile device with respect to one of the plurality of overlaid geospatial maps.

14. The method of claim 13, wherein the response message including:
a copy of the candidate geospatial-location-specific application associated with the geospatial-location-specific service.

15. The method of claim 13, further comprising:
filtering the searching to find at least one candidate geospatial-location-specific application and associated geospatial-location-specific service based on at least one of:
popularity of a candidate geospatial-location-specific application by users of the candidate geospatial-location-specific application;
public rating of a candidate geospatial-location-specific application by users of the candidate geospatial-location-specific application;
a favorite ranking of a candidate geospatial-location-specific application for a user of the mobile device;

frequency of access to a candidate geospatial-location-specific application by a user of the mobile device; and recency of access to a candidate geospatial-location-specific application by a user of the mobile device.

16. A computer program product for a mobile device, the computer program product comprising:

a storage medium readable by a processing circuit of a mobile device and storing instructions which, responsive to being executed by the processing circuit, cause the processing circuit to perform operations comprising:

determining a current geospatial location of the mobile device with respect to one of a plurality of overlaid geospatial maps where each of the plurality of overlaid geospatial maps corresponds to a different context for a request message to send to an application server, each context being different from the context of the other of the plurality of overlaid geospatial maps; storing a representation of the current geospatial location in memory;

sending a request message from the mobile device to an application server, the request message including a representation of the current geospatial location of the mobile device with respect to one of the plurality of overlaid geospatial maps and a request for receiving at the mobile device at least one geospatial-location-specific application associated with at least one geospatial-location-specific service that are both specific to a geospatial location corresponding the current geospatial location of the mobile device;

receiving, from the application server, a response message including identification of at least one candidate geospatial-location-specific application associated with a geospatial-location-specific service that is specific to a geospatial location that is within a defined nearby vicinity area of the current geospatial location of the mobile device with respect to one of the plurality of overlaid geospatial maps; and presenting at a user interface associated with the mobile device a list of user selectable choices prioritized by proximity of geospatial location associated with each candidate geospatial-location-specific application associated with a geospatial-location-specific service relative to the current geospatial location of the mobile device with respect to one of the plurality of overlaid geospatial maps.

17. The computer program product of claim 16, wherein the response message includes a copy of at least one candidate geospatial-location-specific application associated with a geospatial-location-specific service that are both specific to the current geospatial location of the mobile device.

18. The computer program product of claim 16, wherein the response message including:

a uniform resource locator (URL), lower than a top level domain uniform resource locator (TLD URL), associated with a network location of an instance of each identified candidate geospatial-location-specific application.

19. The computer program product of claim 16, wherein at least one user-selectable choice in the list being selectable by a user of the mobile device to request receiving from an application server a copy of an identified candidate geospatial-location-specific application associated with the one user-selectable choice.

20. The computer program product of claim 16, wherein the presenting comprises:

displaying the list of user selectable choices at the user interface, the list being further prioritized by at least one of:

popularity of each identified candidate geospatial-location-specific application associated with a geospatial-location-specific service;

public rating of each identified candidate geospatial-location-specific application associated with a geospatial-location-specific service;

a favorite ranking of each identified candidate geospatial-location-specific application for a user of the mobile device;

frequency of access to each identified candidate geospatial-location-specific application by a user of the mobile device; and recency of access to each identified candidate geospatial-location-specific application by a user of the mobile device.

* * * * *